United States Patent
Bonroy et al.

(10) Patent No.: US 10,486,650 B2
(45) Date of Patent: Nov. 26, 2019

(54) END CAP ARRANGEMENT

(71) Applicant: Robert Bosch GmbH, Stuttgart (DE)

(72) Inventors: Jan Bonroy, Heverlee (BE); Stijn Truyens, Tienen (BE); Hans Beelen, Herk de Stad (BE); Hubert Verelst, Tienen (BE)

(73) Assignee: Robert Bosch GmbH, Stuttgart (DE)

( * ) Notice: Subject to any disclaimer, the term of this patent is extended or adjusted under 35 U.S.C. 154(b) by 365 days.

(21) Appl. No.: 15/034,203

(22) PCT Filed: Oct. 27, 2014

(86) PCT No.: PCT/EP2014/073007
§ 371 (c)(1),
(2) Date: May 4, 2016

(87) PCT Pub. No.: WO2015/067496
PCT Pub. Date: May 14, 2015

(65) Prior Publication Data
US 2016/0280185 A1    Sep. 29, 2016

(30) Foreign Application Priority Data

Nov. 5, 2013 (DE) .......... 10 2013 222 420
Dec. 16, 2013 (DE) .......... 10 2013 226 036

(51) Int. Cl.
*B60S 1/04* (2006.01)
*B60S 1/38* (2006.01)

(52) U.S. Cl.
CPC ........... *B60S 1/0408* (2013.01); *B60S 1/3891* (2013.01); *B60S 1/3896* (2013.01); *B60S 1/3889* (2013.01)

(58) Field of Classification Search
CPC .... B60S 1/3891; B60S 1/3889; B60S 1/3894; B60S 1/3896; B60S 1/3893
See application file for complete search history.

(56) References Cited

U.S. PATENT DOCUMENTS

2007/0240271 A1* 10/2007 Wilms ............... B60S 1/38
                                                15/145
2007/0289082 A1* 12/2007 Herinckx ........... B60S 1/38
                                              15/250.361
(Continued)

FOREIGN PATENT DOCUMENTS

CN    1956867 A    5/2007
CN   101506012 A   8/2009
(Continued)

OTHER PUBLICATIONS

International Search Report for Application No. PCT/EP2014/073007 dated Jan. 21, 2015 (English Translation, 3 pages).

*Primary Examiner* — Andrew A Horton
(74) *Attorney, Agent, or Firm* — Michael Best & Friedrich LLP

(57) ABSTRACT

The invention relates to an end cap arrangement, more particularly for a wiper blade (12a; 12b), comprising an end cap main part (14a; 14b) that can be fixedly connected to a main component (10a; 10b) of a wiper blade (12a; 12b). It is proposed that the end cap arrangement comprise at least an end cap spoiler element (16a; 16b) which is designed so that in an installed condition an installation opening (18a; 18b) is left free for a wiper rubber (20a; 20b).

22 Claims, 7 Drawing Sheets

(56) References Cited

U.S. PATENT DOCUMENTS

| | | | |
|---|---|---|---|
| 2008/0016643 A1 | 1/2008 | Braun et al. | |
| 2009/0172910 A1* | 7/2009 | De Block | B60S 1/38 15/250.361 |
| 2010/0101041 A1 | 4/2010 | Coemans et al. | |
| 2010/0180395 A1* | 7/2010 | Aznag | B60S 1/38 15/250.31 |

FOREIGN PATENT DOCUMENTS

| | | |
|---|---|---|
| CN | 102548811 A | 7/2012 |
| DE | 102007043528 | 3/2009 |
| DE | 102010042095 | 4/2011 |
| DE | 102011076362 | 11/2012 |
| KR | 20110053611 A | 5/2011 |
| WO | 2005115813 | 12/2005 |
| WO | 2012130797 | 10/2012 |

* cited by examiner

END CAP ARRANGEMENT

BACKGROUND OF THE INVENTION

An end cap device, in particular for a wiper blade, having an end cap base member which can be securely connected to at least one main component of a wiper blade, has already been proposed.

SUMMARY OF INVENTION

The invention is based on an end cap device, in particular for a wiper blade, having an end cap base member which can be securely connected to at least one main component of a wiper blade.

It is proposed that the end cap device comprise at least one end cap spoiler element which is provided to release an assembly opening for a wiper arm in an assembly configuration. A wiper lip of the wiper blade can thereby advantageously be replaced in a simple manner. In a further advantageous manner, aerodynamic disturbances of the end cap device, in particular during travel operation, can be prevented. The term "main component" is intended in this context in particular to be understood to be at least one resilient rail, a wind deflection element and/or a retention element. The term "resilient rail" is intended in particular to be understood to be a macroscopic element which has at least one extent which can be resiliently changed in a normal operating state by at least 10%, in particular by at least 20%, preferably by at least 30% and, in a particularly advantageous manner, by at least 50%, and which in particular produces a counter-force which is dependent on a change of the extent and which is preferably proportional to the change and which counteracts the change. Preferably, the resilient rail is at least partially formed from a spring steel. In an unloaded state, the resilient rail is preferably substantially in the form of a bent rod and, in a particularly advantageous manner, a flattened bent rod. In a particularly advantageous manner, a curvature of the resilient rail along a longitudinal extent in an unloaded state is greater than a curvature of a vehicle surface of a motor vehicle, in particular a motor vehicle window, by means of which the resilient rail is guided in at least one operating state. The term "extent" of an element is intended in particular to be understood to be a maximum spacing between two points of a perpendicular projection of the element on a plane. The term "macroscopic element" is intended in particular to be understood to be an element with an extent of at least 1 mm, in particular at least 5 mm, and preferably at least 10 mm.

The term "wiper blade" is intended in particular to be understood to be a unit of a resilient material having a wiper lip which is provided, in order to clean a surface which is intended to be cleaned, in particular a window surface, preferably of a vehicle window, to be moved in contact over the surface to be cleaned. Preferably, the wiper blade is produced from a natural or synthetic elastomer material, in particular rubber. The term "wind deflection element" is intended in this context in particular to be understood to be an element which is provided to deflect a travel wind which acts on the wiper blade and/or to use it for pressing the wiper blade onto a vehicle window. Preferably, the wind deflection element has at least one concave wind deflection face. In particular, the wind deflection element is constructed to be different from a wiper blade adapter and/or an end cap. The term "retention element" is intended in this context to refer in particular to an element which is provided to retain a resilient rail. Preferably, the retention element is formed by an extruded member, in particular of plastics material.

The term "end cap spoiler element" is intended in this context in particular to be understood to refer to an element of an end cap which in at least one operating state is provided for an aerodynamic production of a pressing force of the end cap device, in particular in the direction of a vehicle window. Preferably, the at least one end cap spoiler element has at least one substantially concave-curved main flow face. The main flow face is in particular provided to deflect an incoming air flow. Preferably, the at least one end cap spoiler element has at least a first face which in at least one operating state extends at least substantially parallel with a vehicle window. In a further advantageous manner, the at least one end cap spoiler element has at least a second face which in at least one operating state extends at least substantially perpendicularly to the vehicle window. The second face is preferably smooth in this instance, in particular free from corrugation. The term "at least substantially" is in this context intended in particular to be understood to be an angular deviation of less than 15°, preferably less than 10°, in a particularly preferred manner less than 5°, in a quite particularly preferred manner less than 2°. The term "can be securely connected" is intended in this context in particular to be understood to be able to be connected in a non-detachable and/or non-releasable manner. The term "connected in a non-releasable manner" is intended in this context in particular to be understood to mean that destruction-free separation is prevented.

The term "assembly configuration" is intended in this context to be understood in particular to be a configuration of the end cap device in which a wiper arm can be assembled and/or disassembled. In particular, the wiper blade in the assembly configuration can be pulled out of and/or pushed into a wiper blade. The term "assembly opening" is intended in this context to refer in particular to an opening, in particular a gap, through which the wiper arm can be guided during assembly and/or disassembly. Preferably, the assembly opening opens the end cap device in a longitudinal direction. The term "longitudinal direction" in this context is intended to be understood in particular to be a direction which extends at least substantially parallel with a main longitudinal extent of the end cap device and/or at least substantially parallel with a main longitudinal extent of the wiper arm. The term "provided" is intended in particular to be understood to be specifically configured and/or equipped. The fact that an object is provided for a specific function is intended in particular to be understood to mean that the object performs and/or carries out this specific function in at least one application and/or operating state.

In another embodiment of the invention, it is proposed that the at least one end cap spoiler element be movably supported on the end cap base member, whereby a particularly simple production of the assembly configuration can be achieved.

It is further proposed that the at least one end cap spoiler element be displaceably supported on the end cap base member, whereby a movement which may be obtained in a particularly simple and intuitive manner in respect of the at least one end cap spoiler element can be achieved. Preferably, the at least one end cap spoiler element is displaceably supported on the end cap base member in a wiping direction. In an additional and/or alternative embodiment, it is proposed that the at least one end cap spoiler element be pivotably supported on the end cap base member.

It is further proposed that the at least one end cap spoiler element have an opening direction which is directed from the end cap base member at least partially toward a leeward side. Preferably, the at least one end cap spoiler element can be opened at least partially in the opening direction. The term "opening direction" in this context is intended to be understood in particular to be a direction in which the at least one end cap spoiler element is constructed so as to be able to be at least partially displaced relative to the end cap base member in order to produce an opening. Preferably, this is intended in particular to be understood to be a direction in which the end cap spoiler element can be displaced from a position mounted on the end cap base member relative to the end cap base member, in particular is displaced at least substantially in the direction toward an opening. In a particularly preferred manner, this is intended in particular to be understood to be a direction which extends at least substantially parallel with a translation axis of the displacement movement of the end cap spoiler element relative to the end cap base member. The fact that the opening direction "is directed in the direction toward a leeward side" is intended in particular to be understood to mean that the opening direction is directed from the end cap base member in the direction of a leeward side of the end cap device. Preferably, this is intended in particular to be understood to mean that the opening direction corresponds to a wiping direction of the wiper blade during a movement with the wind, that is to say, in particular during an upward movement. In this instance, the term "leeward side" is in this context intended in particular to be understood to be a side facing away from the wind, in particular a side facing away from the travel wind. This is preferably intended in particular to be understood to be a side facing away from the wind, in particular a side facing away from the travel wind, of the end cap device and/or in particular the wiper blade. Furthermore, the term "wiper direction" is intended in particular to be understood in this instance to be a tangential direction in which the wiper blade is guided in an operating state over a vehicle window which is intended to be wiped. It is thereby possible in particular to achieve an advantageously comfortable opening of the end cap spoiler element. Furthermore, it is thereby possible to provide a movement which may be obtained in a simple and intuitive manner in respect of the at least one end cap spoiler element.

It is further proposed that the at least one end cap spoiler element have an opening direction, which is directed from the end cap base member at least partially toward a windward side. The fact that the opening direction "is directed toward a windward side" is intended in particular to be understood to mean that the opening direction is directed from the end cap base member in the direction of a windward side of the end cap device. This is preferably intended in particular to be understood to mean that the opening direction corresponds to a wiper direction of the wiper blade during a movement against the wind, that is to say, in particular during a downward movement. In this instance, a "windward side" in this context is intended in particular to be understood to be a side facing the wind, in particular a side facing the travel wind. This is preferably intended in particular to be understood to be a side facing the wind, in particular a side facing the travel wind, of the end cap device and/or in particular the wiper blade. It is thereby possible to achieve in particular an advantageously comfortable opening of the end cap spoiler element. Preferably, it is thereby possible to prevent undesirable release of the end cap spoiler element from the end cap base member, which release is caused by the travel wind. In particular, it is thus possible to achieve, as a result of a pressing force caused by the travel wind, additional retention of the end cap spoiler element on the end cap base member.

A particularly reliable and rapid securing of the at least one end cap spoiler element can be achieved when the end cap device comprises a catch unit, which is provided to engage the at least one end cap spoiler element on the end cap base member in an operating configuration. The term "catch unit" in this context is intended in particular to be understood to be a unit which has at least one catch hook, which is provided during a locking operation to be redirected from a starting position in a resilient manner and, when a locking position is reached, moves in a resilient manner at least partially back into the starting position.

If the catch unit comprises at least one catch hook which is constructed integrally with the at least one end cap spoiler element, a locking of the at least one end cap spoiler element can be achieved, which locking is particularly cost-effective to produce and stable.

It is further proposed that the end cap device have an operating unit which is provided to move the catch unit into a release configuration. It is thereby possible for an operator to release the catch unit in a particularly simple manner without the use of tools. The term "release configuration" is intended in this context in particular to be understood to be a configuration in which the at least one end cap spoiler element can be moved, in particular displaced, in order to release the assembly opening.

It is further proposed that the operating unit comprise at least one operating element which is constructed integrally with the at least one end cap spoiler element. The operating element can thereby be produced in a particularly cost-effective manner. Preferably, the operating unit has at least one corrugated operating region. In a particularly preferred manner, the corrugated operating region extends on a face which extends at least substantially parallel with a vehicle window to be wiped.

If the end cap device has a limitation unit which is provided to limit a movement freedom of the at least one end cap spoiler element in an assembly configuration in an opening direction, the at least one end cap spoiler element can advantageously be prevented from falling off the end cap base member and/or becoming lost.

The end cap device can be constructed in an aerodynamically advantageous manner when the at least one end cap spoiler element has at least partially a flush surface extent with respect to the end cap base member. The term "flush" is intended in this context in particular to be understood to be offset-free, smooth and/or without edges.

A system having a wiper blade and an end cap device according to the invention is further proposed.

Furthermore, a method for releasing an assembly opening of an end cap base member is proposed, wherein at least one end cap spoiler element is moved relative to the end cap base member.

The end cap device according to the invention is in this instance not intended to be limited to the above-described application and embodiment. In particular, the end cap device according to the invention may have, in order to carry out an operating method described herein, a number which differs from a number mentioned herein of individual elements, components and units.

BRIEF DESCRIPTION OF THE DRAWINGS

Other advantages will be appreciated from the following description of the drawings. In the drawings, two embodiments of the invention are illustrated. The drawings, the description and the claims contain a number of features in combination. The person skilled in the art will advantageously also consider the features individually and combine them to form other advantageous combinations.

In the drawings.

DETAILED DESCRIPTION

Figure 1:
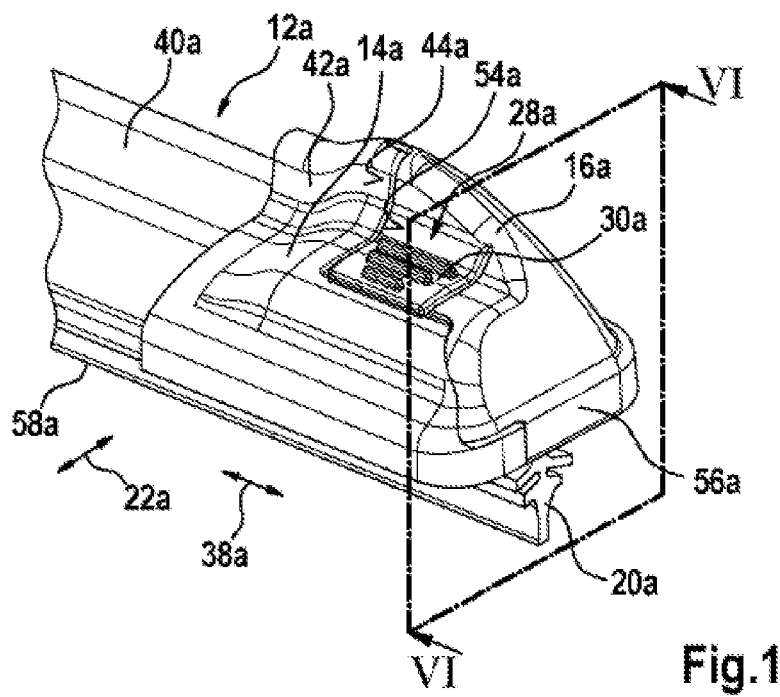
FIG. 1 is a perspective view of a wiper blade with an end cap device according to the invention.

FIG. 1 shows a wiper blade 12a and an end cap device for the wiper blade 12a. The wiper blade 12a is provided for wiping a vehicle window, in particular a vehicle window of a motor vehicle. The end cap device is provided to close the wiper blade 12a in a longitudinal direction 38a. Furthermore, the end cap device is provided to retain a wiper arm 20a of the wiper blade 12a in a secure position in an operating state. The wiper arm 20a is produced from a resilient material, in particular from rubber. Furthermore, the wiper arm 20a has a wiper lip 58a. The wiper lip 58a is provided for cleaning a vehicle window.

The end cap device has an end cap base member 14a. The end cap base member 14a is securely connected to a main component 10a of the wiper blade 12a. The main component 10a is formed by means of two resilient rails 36a which extend parallel with each other. The resilient rails 36a are constructed from a spring steel. In the embodiment shown, the end cap base member 14a is securely connected to at least one resilient rail 36a. More specifically, the end cap base member 14a is connected to the resilient rail 36a in a non-releasable manner. However, in this context it is also conceivable for the end cap base member 14a to be securely connected to a wind deflection element 40a of the wiper blade 12a. The end cap base member 14a is at least substantially formed from plastics material. The end cap base member 14a has a spoiler attachment 42a. The spoiler attachment 42a is provided to deflect travel wind and to produce a pressing pressure in the direction of a vehicle window. The spoiler attachment 42a is arranged at a side of the end cap base member 14a facing away from the vehicle window.

Furthermore, the end cap device comprises an end cap spoiler element 16a. The spoiler attachment 42a merges with a wind flow face 44a in a flush manner into the end cap spoiler element 16a. The end cap spoiler element 16a has in this instance a flush surface extent with respect to the end cap base member 14a. The end cap spoiler element 16a comprises a single component. However, it is also conceivable in principle for the end cap spoiler element 16a to comprise a plurality of components, in particular to be constructed in two parts. The end cap spoiler element 16a is connected to the end cap base member 14a in a non-releasable manner.

Figure 2:
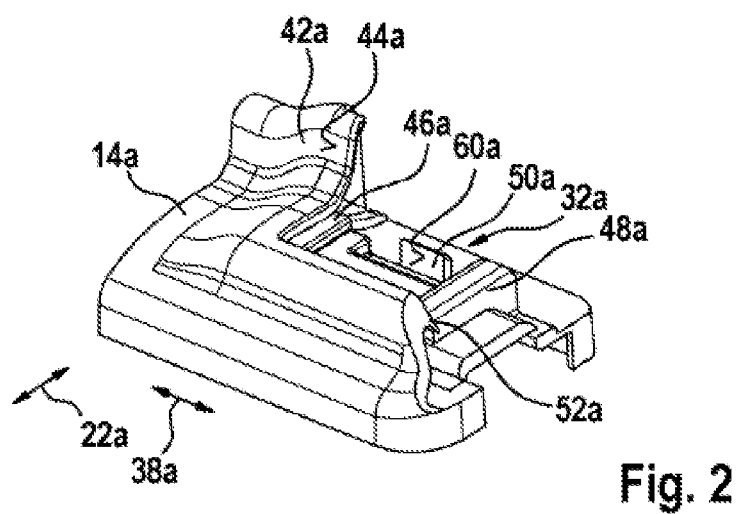
FIG. 2 is a perspective view of an end cap base member of the end cap device according to the invention according to FIG. 1.
Figure 3:
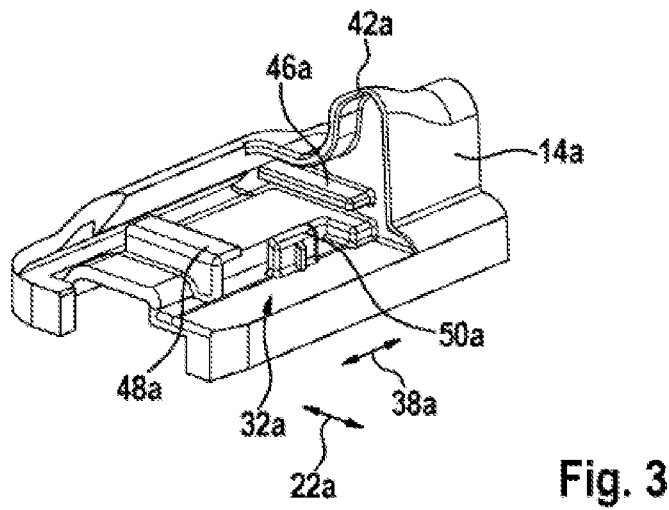
FIG. 3 is another perspective view of an end cap base member of the end cap device according to the invention according to FIG. 1.

The end cap base member 14a is illustrated in greater detail in FIGS. 2 and 3. The end cap base member 14a has at least one guiding rail 46a, 48a which is provided for movable support of the end cap spoiler element 16a. More specifically, the end cap base member 14a has two guiding rails 46a, 48a which are provided for movable support of the end cap spoiler element 16a. The end cap spoiler element 16a is consequently movably supported on the end cap base member 14a. The guiding rails 46a, 48a extend at least substantially parallel with a wiping direction 22a. The wiping direction 22a extends in this instance perpendicularly to the longitudinal direction 38a. Consequently, the end cap spoiler element 16a is displaceably supported on the end cap base member 14a. More specifically, the end cap spoiler element 16a is displaceably supported on the end cap base member 14a in the wiping direction 22a. The end cap spoiler element 16a has an opening direction 34b. The end cap spoiler element 16a can be opened partially in the opening direction 34a. The opening direction 34a extends parallel with the wiping direction 22a. The opening direction 34a is the direction in which the end cap spoiler element 16a can be displaced from an operating configuration in a state supported on the end cap base member 14a into an assembly configuration. The opening direction 34a is directed from the end cap base member 14a toward a leeward side. The opening direction 34a is directed from the end cap base member 14a toward a side facing away from the wind, in particular a side facing away from travel wind. The end cap spoiler element 16a is closed counter to the opening direction, that is to say, pushed into an operating configuration on the end cap base member 14a. The end cap base member 14a further has a barb 52a. The barb 52a is constructed integrally with the end cap base member 14a, in particular with the spoiler attachment 42a.

Figure 4:
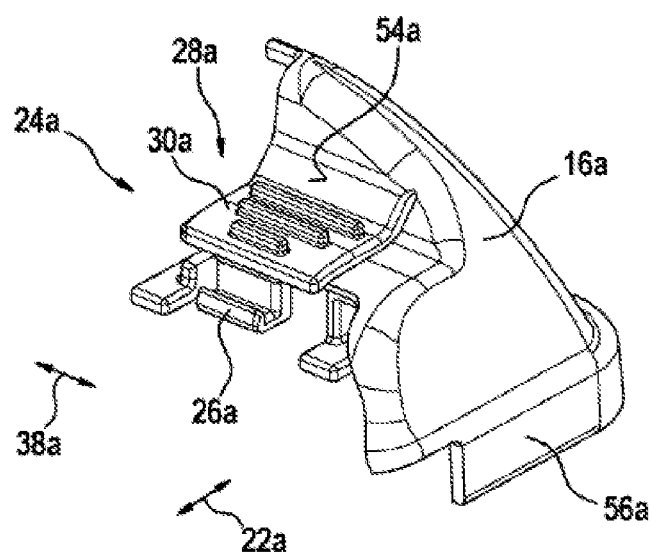
FIG. 4 is a perspective view of an end cap spoiler element of the end cap device according to the invention according to FIG. 1.
Figure 5:
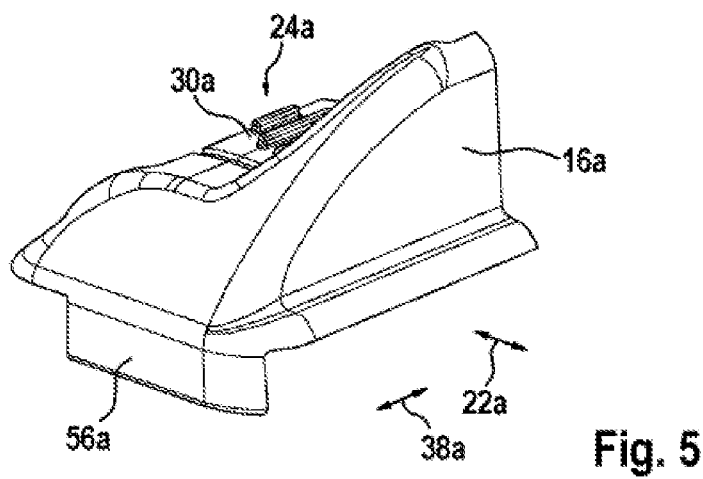
FIG. 5 is another perspective view of an end cap spoiler element of the end cap device according to the invention according to FIG. 1.

The end cap spoiler element 16a is shown in greater detail in FIGS. 4 and 5. The end cap spoiler element 16a aerodynamically produces in an operating state a pressing pressure of the end cap device in the direction of the vehicle window. Preferably, the end cap spoiler element 16a has a main flow face 54a which is curved in a concave manner. The end cap spoiler element 16a has a closure wall 56a. The closure wall 56a extends at least substantially perpendicularly relative to the longitudinal direction 38a. The closure wall 56a forms a closure of the end cap device in the longitudinal direction 38a. Furthermore, the closure wall 56a closes an assembly opening 18a in an operating state. In an assembly configuration, the wiper arm 20a can be guided through the assembly opening 18a.

The end cap device comprises a catch unit 24a which is provided to engage the end cap spoiler element 16a in an operating configuration on the end cap base member 14a. The catch unit 24a has to this end a catch hook 26a which is constructed integrally with the end cap spoiler element 16a. The catch hook 26a is provided to be redirected in a resilient manner from a starting position during a locking operation. More specifically, the catch hook 26a is resiliently redirected by the barb 52a during the locking operation. When a locking position is reached, the catch hook 26a moves resiliently back into the starting position. In this instance, the catch hook 26a engages with the barb 52a and prevents movement of the end cap spoiler element 16a relative to the end cap base member 14a.

The end cap device further has an operating unit 28a which is provided to move the catch unit 24a into a release configuration. The operating unit 28a comprises an operating element 30a. The operating element 30a is constructed integrally with the end cap spoiler element 16a. The operating element 30a is constructed integrally with the catch hook 26a. The operating element 30a can be resiliently redirected by hand. When the operating element 30a is redirected, the catch hook 26a is released by the barb 52a. The end cap spoiler element 16a can subsequently be displaced along the guiding rails 46a, 48a between an operating configuration and the assembly configuration. The end cap spoiler element 16a can subsequently be displaced in an opening direction 34a along the guiding rails 46a, 48a between an operating configuration and the assembly configuration. The end cap spoiler element 16a is consequently provided to release the assembly opening 18a for the wiper arm 20a in an assembly configuration.

Figure 6:
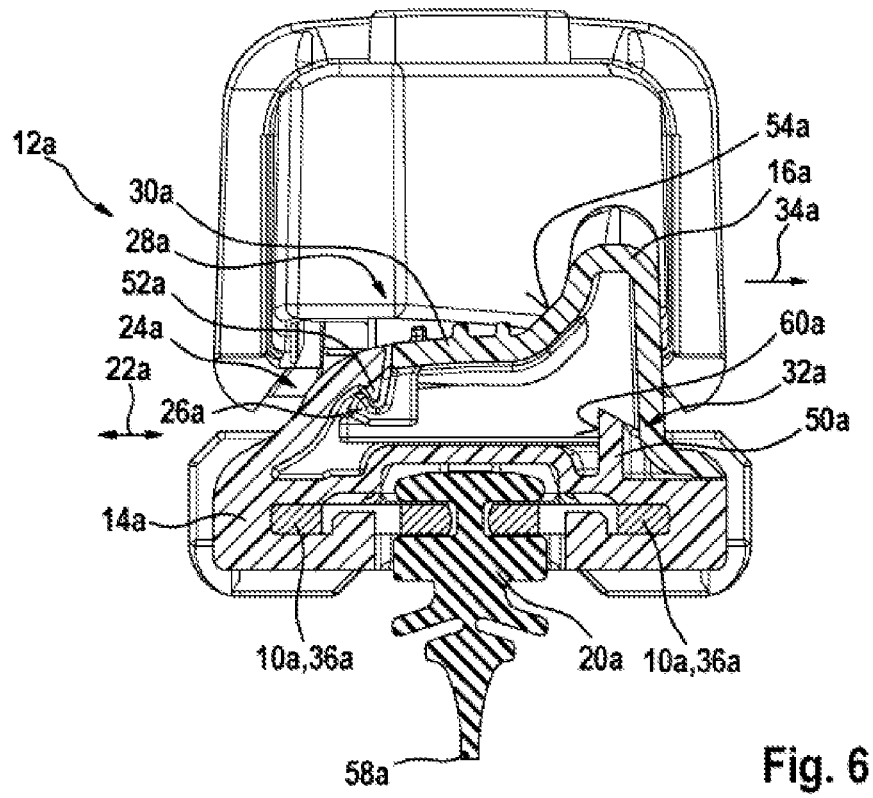
FIG. 6 is a sectioned illustration through VI-VI of a system having a wiper blade and the end cap device.

As shown in FIG. 6, the end cap device additionally has a limitation unit 32a. The limitation unit 32a is provided to limit a movement freedom of the end cap spoiler element 16a in the assembly configuration in the opening direction 34a. The limitation unit 32a comprises a stop element 50a. The stop element 50a is constructed integrally with the end cap base member 14a. The stop element 50a is constructed in a plate-like manner. The stop element 50a has in this instance a stop face 60a which extends at least substantially perpendicularly relative to the wiping direction 22a. In the assembly configuration, the catch hook 26a abuts the stop element 50a, in particular the stop face 60a.

Figure 7:
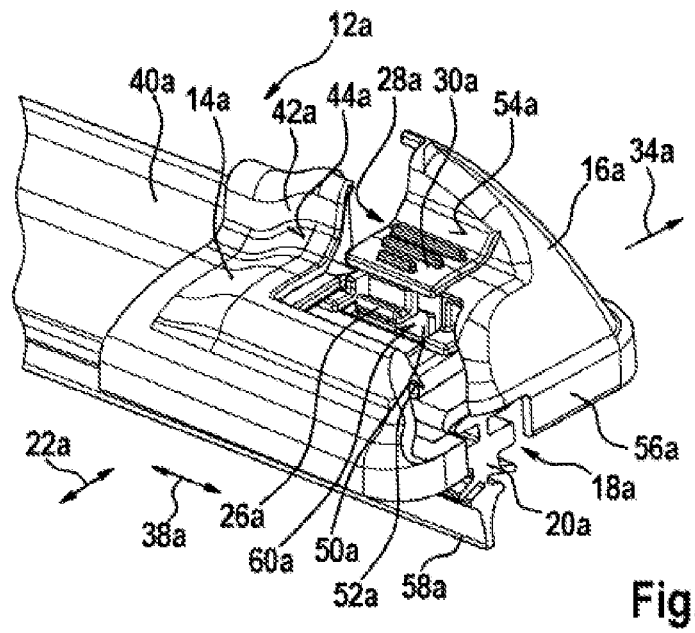
FIG. 7 is a perspective illustration of the system according to FIG. 6 in an assembly configuration.
Figure 8:
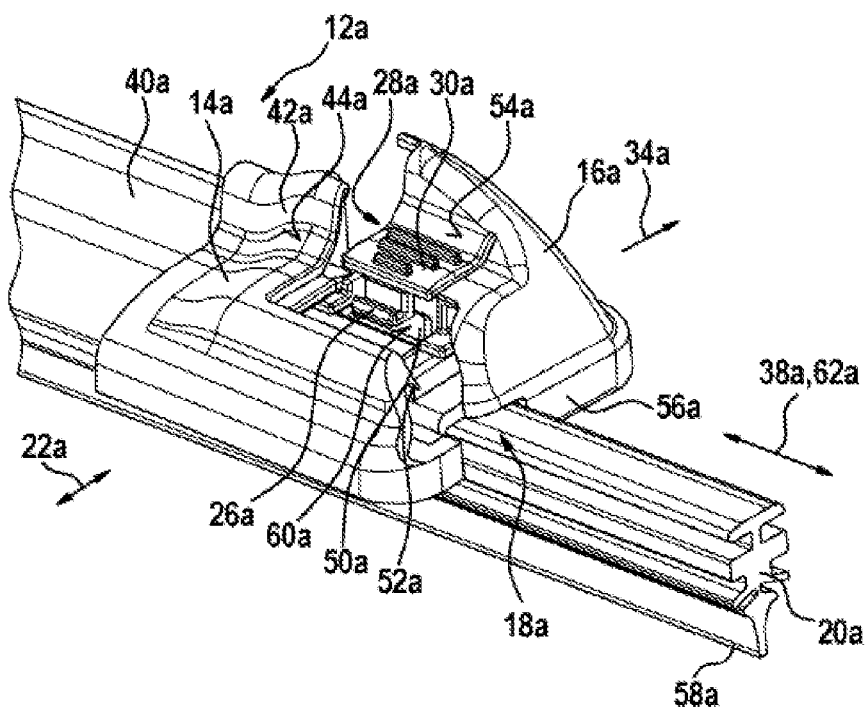
FIG. 8 is another perspective view of the system according to FIG. 6 in an assembly configuration.

FIG. 7 shows the wiper blade 12a and the end cap device in the assembly configuration. In the assembly configuration, the wiper arm 20a can be assembled or disassembled (FIG. 8). The wiper arm 20a can in this instance be pulled out of or pushed into a wiper blade 12a. The assembly opening 18a is produced by means of a gap between the end cap base member 14a and the closure wall 56a of the end cap spoiler element 16a in the assembly configuration.

In order to exchange the wiper blade 20a, in a first disassembly step, the operating element 30a is redirected manually. The end cap device is thereby moved from an operating configuration into a release configuration. In the release configuration, the catch unit 24a releases a movement freedom of the end cap spoiler element 16a relative to the end cap base member 14a. In a second disassembly step, the end cap spoiler element 16a is moved in the opening direction 34a until it strikes the stop element 50a. Consequently, the end cap spoiler element 16a is moved relative to the end cap base member 14a. In the second disassembly step, the assembly opening 18a is released. In a third disassembly step, the wiper arm 20a is pulled out of the wiper blade 12a through the assembly opening 18a in a displacement direction 62a. The displacement direction 62a extends at least substantially parallel with the longitudinal direction 38a. Subsequently, a new wiper arm is pushed in a first assembly step through the assembly opening 18a into the wiper blade 12a. In a second assembly step, the end cap spoiler element 16a is moved counter to the opening direction 34a until the catch unit 24a engages the end cap base member 14a and the end cap spoiler element 16a with each other. Consequently, the end cap device is moved back into the operating configuration.

In FIGS. 9 to 14, another embodiment of the invention is shown. The following descriptions are substantially limited to the differences between the embodiments, wherein, with respect to components, features and functions which remain the same, reference may be made to the description of the embodiment of FIGS. 1 to 8. In order to differentiate the embodiments, the letter a in the reference numerals of the embodiment in FIGS. 1 to 8 is replaced by the letter b in the reference numerals of the embodiment of FIGS. 9 to 14. With regard to components which remain the same, in particular with regard to components with the same reference numerals, it is in principle also possible to refer to the drawings and/or the description of the embodiment of FIGS. 1 to 8.

Figure 9:
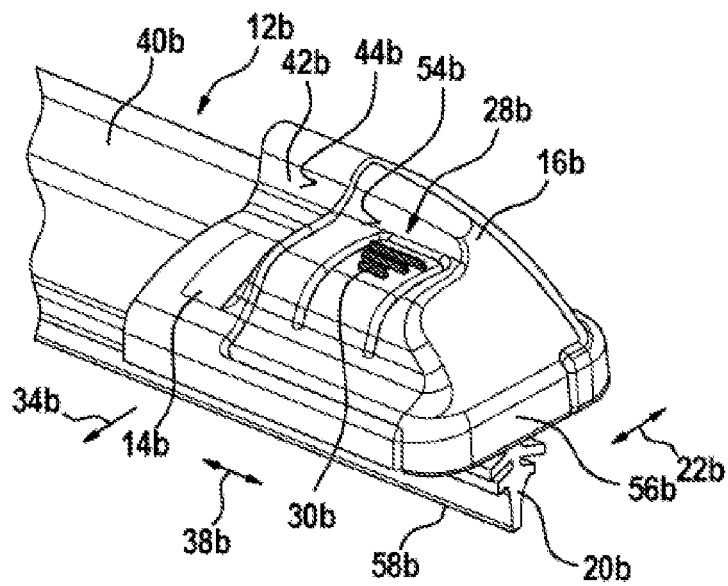
FIG. 9 is a perspective view of a wiper blade with an alternative end cap device according to the invention.

FIG. 9 shows a wiper blade 12b and an end cap device for the wiper blade 12b. The wiper blade 12b is provided for wiping a vehicle window, in particular a vehicle window of a motor vehicle. The end cap device is provided to close the wiper blade 12b in a longitudinal direction 38b. Furthermore, the end cap device is provided to retain a wiper arm 20b of the wiper blade 12b in a fixed position in an operating state.

The end cap device has an end cap base member 14b. The end cap base member 14b is securely connected to a main component 10b of the wiper blade 12b. The main component 10b is formed by means of two resilient rails 36b which extend parallel with each other. Furthermore, the end cap device comprises an end cap spoiler element 16b. The spoiler attachment 42b merges with a wind flow face 44b in a flush manner in the end cap spoiler element 16b. The end cap spoiler element 16b in this instance has a flush surface extent with respect to the end cap base member 14b. The end cap spoiler element 16b is connected to the end cap base member 14b in a non-releasable manner.

Figure 11:
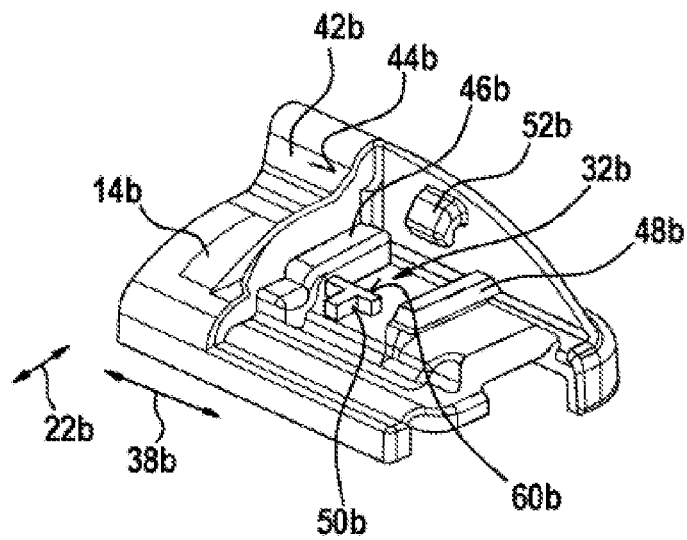
FIG. 11 is a perspective view of an end cap base member of the alternative end cap device according to the invention.

The end cap base member 14b is illustrated in greater detail in FIG. 11. The end cap base member 14b has at least one guiding rail 46b, 48b which is provided to movably support the end cap spoiler element 16b. More specifically, the end cap base member 14b has two guiding rails 46b, 48b which are provided to movably support the end cap spoiler element 16b. The end cap spoiler element 16b is consequently movably supported on the end cap base member 14b. The guiding rails 46b, 48b extend at least substantially parallel with a wiping direction 22b. The wiping direction 22b extends perpendicularly relative to the longitudinal direction 38b in this case. Consequently, the end cap spoiler element 16b is displaceably supported on the end cap base member 14b. More specifically, the end cap spoiler element 16b is displaceably supported in the wiping direction 22b on the end cap base member 14b. The end cap spoiler element 16b has an opening direction 34b. The end cap spoiler element 16b can be partially opened in the opening direction 34b. The opening direction 34b extends parallel with the wiping direction 22b. The opening direction 34b is the direction in which the end cap spoiler element 16b can be displaced from an operating configuration in a state supported on the end cap base member 14b into an assembly configuration. The opening direction 34b is directed from the end cap base member 14b toward a windward side. The opening direction 34b is directed from the end cap base member 14b toward a side facing the wind, in particular a side facing a travel wind. The end cap spoiler element 16b is closed counter to the opening direction, that is to say, pushed onto the end cap base member 14b in an operating configuration. The end cap base member 14b further has a barb 52b. The barb 52b is integrally constructed with the end cap base member 14b, in particular with the spoiler attachment 42b.

Figure 12:
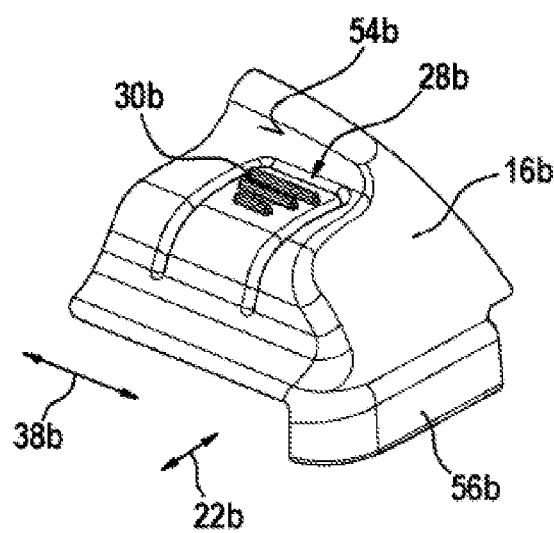
FIG. 12 is a perspective view of an end cap spoiler element of the alternative end cap device according to the invention.
Figure 13:
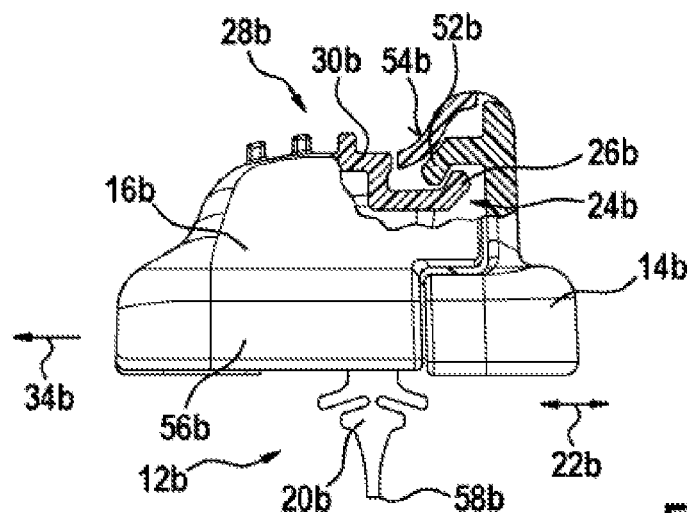
FIG. 13 is a schematic partially sectioned illustration of the system with the wiper blade and the alternative end cap device according to the invention in an operating configuration.

The end cap spoiler element 16b is shown in greater detail in FIG. 12. The end cap spoiler element 16b aerodynamically produces in an operating state a pressing pressure of the end cap device in the direction of the vehicle window. Preferably, the end cap spoiler element 16b has a concave-curved main flow face 54b. The end cap spoiler element 16b forms a large portion of a flow face 44b, 54b of the end cap device. The end cap spoiler element 16b has a closure wall 56b. The closure wall 56b extends at least substantially perpendicularly to the longitudinal direction 38b. The closure wall 56b forms a closure of the end cap device in the longitudinal direction 38b. Furthermore, the closure wall 56b closes an assembly opening 18b in an operating state. The wiper arm 20b can be guided through the assembly opening 18b in an assembly configuration.

The end cap device comprises a catch unit 24b which is provided to engage the end cap spoiler element 16b in an operating configuration on the end cap base member 14b. The catch unit 24b has to this end a catch hook 26b which is constructed integrally with the end cap spoiler element 16b.

The end cap device further has an operating unit 28b which is provided to move the catch unit 24b into a release configuration. The operating unit 28b comprises an operating element 30b. The operating element 30a is constructed integrally with the end cap spoiler element 16b. The operating element 30b is constructed integrally with the catch hook 26b. The operating element 30b can be resiliently redirected manually. When the operating element 30b is redirected, the catch hook 26b is released from the barb 52a. The end cap spoiler element 16b can subsequently be displaced along the guiding rails 46b, 48b between an operating configuration and the assembly configuration. The end cap spoiler element 16b can subsequently be displaced in an opening direction 34b along the guiding rails 46b, 48b between an operating configuration and the assembly configuration. The end cap spoiler element 16b is consequently provided to release the assembly opening 18b for the wiper arm 20b in an assembly configuration.

Furthermore, the end cap device additionally has a limitation unit 32b. The limitation unit 32b is provided to limit a movement freedom of the end cap spoiler element 16b in an opening direction 34b in the assembly configuration.

Figure 10:
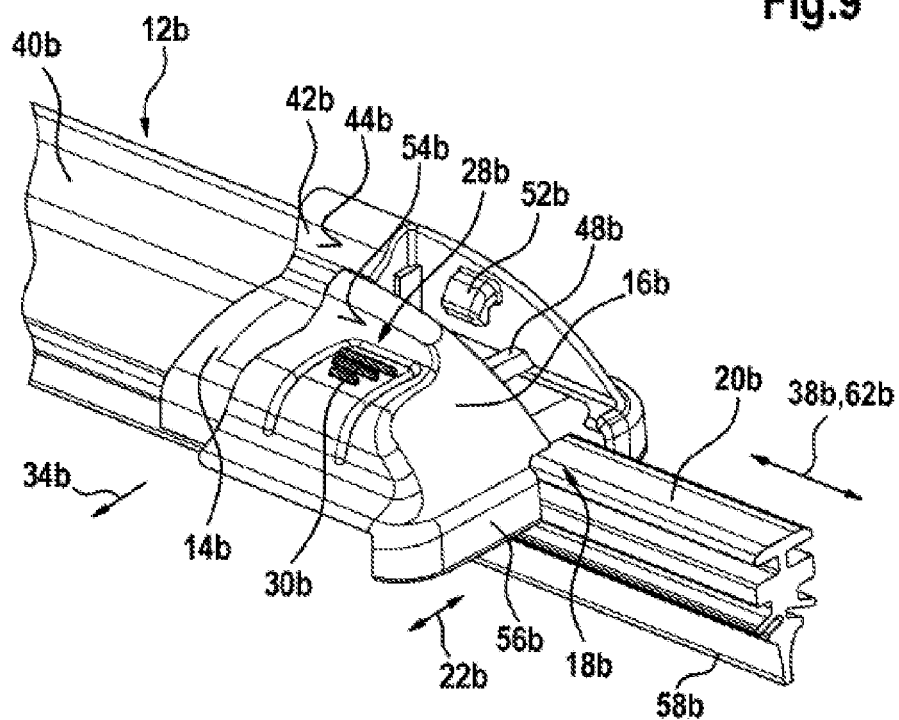
FIG. 10 is a perspective view of a system having a wiper blade and the alternative end cap device according to the invention in an assembly configuration.
Figure 14:
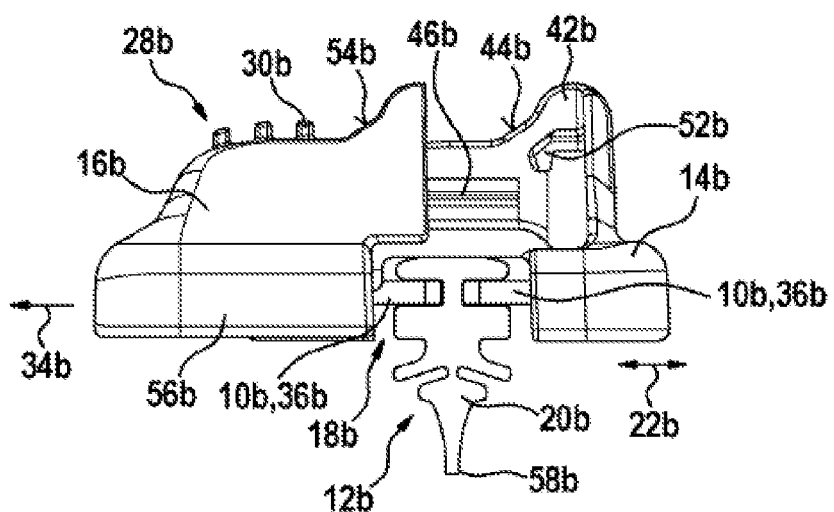
FIG. 14 is a schematic illustration of the system with the wiper blade and the alternative end cap device according to the invention in another assembly configuration.

FIGS. 10 and 14 show the wiper blade 12b and the end cap device in the assembly configuration. In the assembly configuration, the wiper arm 20b can be assembled or disassembled. In this instance, the wiper arm 20b can be pulled out of a wiper blade 12b or pushed into a wiper blade. The assembly opening 18b is produced by means of a gap between the end cap base member 14b and the closure wall 56b of the end cap spoiler element 16b in the assembly configuration.

In order to replace the wiper arm 20b, in a first disassembly step, the operating element 30b is redirected manually. The end cap device is thereby moved from an operating configuration into a release configuration. In the release configuration, the catch unit 24b releases a movement freedom of the end cap spoiler element 16b relative to the end cap base member 14b. In a second disassembly step, the end cap spoiler element 16b is moved in the opening direction 34b until it strikes the stop element 50b. Consequently, the end cap spoiler element 16b is moved relative to the end cap base member 14b. In the second disassembly step, the assembly opening 18b is released. In a third disassembly step, the wiper arm 20b is pulled out of the wiper blade 12b through the assembly opening 18b in a displacement direction 62b. The displacement direction 62b extends at least substantially parallel with the longitudinal direction 38b. Subsequently, a new wiper arm is inserted in a first assembly step through the assembly opening 18b into the wiper blade 12b. In a second assembly step, the end cap spoiler element 16b is moved counter to the opening direction 34b, until the catch unit 24b engages the end cap base member 14b and the end cap spoiler element 16b with each other. Consequently, the end cap device is moved back into the operating configuration.

What is claimed is:

1. An end cap device for a wiper blade (12a; 12b), the end cap device having an end cap base member (14a; 14b) which is configured to be securely connected to a main component (10a; 10b) of the wiper blade (12a; 12b) along a lower region of the end cap base member, wherein the end cap base member (14a; 14b) extends along a longitudinal direction (38a; 38b) and includes a first concave wind flow face (44a) along an upper region of the end cap base member, wherein the end cap device is configured to close the wiper blade (12a, 12b) in the longitudinal direction, wherein the end cap device further includes at least one end cap spoiler element (16a; 16b) coupled to the end cap base member (14a; 14b) and configured to slide linearly relative to the end cap base member (14a; 14b) along a wiping direction (22a, 22b) that is perpendicular to the longitudinal direction so as to provide an assembly opening (18a; 18b) between the end cap base member and the end cap spoiler element (16a; 16b) for insertion of a wiper arm (20a; 20b) linearly along the longitudinal direction (38a; 38b) through the assembly opening, wherein the end cap spoiler element (16a; 16b) includes a second concave wind flow face (54) along an upper region of the end cap spoiler element (16a; 16b) that is flush with the first concave wind flow face (44) in an assembled state of the end cap device.

2. The end cap device as claimed in claim 1, characterized in that the at least one end cap spoiler element (16a; 16b) is movably supported on the end cap base member (14a; 14b).

3. The end cap device as claimed in claim 1, characterized in that the at least one end cap spoiler element (16a; 16b) is displaceably supported on the end cap base member (14a; 14b).

4. The end cap device as claimed in claim 1, characterized in that the at least one end cap spoiler element (16a) has an opening direction (34a) which is directed from the end cap base member (14a) toward a leeward side of the end cap device and perpendicular to the longitudinal direction, wherein the leeward side is a side configured to face away from travel wind during movement of the wiper blade (12a; 12b).

5. The end cap device as claimed in claim 1, characterized in that the at least one end cap spoiler element (16b) has an opening direction (34b) which is directed from the end cap base member (14b) at least partially toward a windward side.

6. The end cap device as claimed in claim 1, further comprising a catch unit (24a; 24b) configured to engage the at least one end cap spoiler element (16a; 16b) on the end cap base member (14a; 14b) in an operating configuration.

7. The end cap device as claimed in claim 6, characterized in that the catch unit (24a; 24b) comprises at least one catch hook (26a; 26b) which is constructed integrally with the at least one end cap spoiler element (16a; 16b).

8. The end cap device as claimed in claim 6, characterized by an operating unit (28a; 28b) configured to move the catch unit (24a; 24b) into a release configuration.

9. The end cap device as claimed in claim 8, characterized in that the operating unit (28a; 28b) comprises at least one operating element (30a; 30b) which is constructed integrally with the at least one end cap spoiler element (16a; 16b).

10. The end cap device as claimed in claim 1, further comprising a limitation unit (32a; 32b) configured to limit a movement freedom of the end cap spoiler element (16a; 16b) in an assembly configuration in an opening direction (34a; 34b).

11. The end cap device as claimed in claim 1, characterized in that the at least one end cap spoiler element (16a; 16b) has at least partially a flush surface extent with respect to the end cap base member (14a; 14b).

12. A system comprising the wiper blade (12a; 12b), and the end cap device as claimed in claim 1.

13. The system as claimed in claim 12, characterized in that the at least one end cap spoiler element (16a; 16b) is movably supported on the end cap base member (14a; 14b).

14. The system as claimed in claim 12, characterized in that the at least one end cap spoiler element (16a; 16b) is displaceably supported on the end cap base member (14a; 14b).

15. The system as claimed in claim 12, characterized in that the at least one end cap spoiler element (16a) has an opening direction (34a) which is directed from the end cap base member (14a) at least partially toward a leeward side.

16. The system as claimed in claim 12, characterized in that the at least one end cap spoiler element (16b) has an opening direction (34b) which is directed from the end cap base member (14b) at least partially toward a windward side.

17. The system as claimed in claim 12, further comprising a catch unit (24a; 24b) configured to engage the at least one end cap spoiler element (16a; 16b) on the end cap base member (14a; 14b) in an operating configuration.

18. A method for releasing the assembly opening (18a; 18b) of the end cap base member (14a; 14b) of claim 1, wherein the at least one end cap spoiler element (16a; 16b) is moved relative to the end cap base member (14a; 14b).

19. The end cap device as claimed in claim 1, wherein the end cap base member includes a first guiding rail (46a) and a second guiding rail (48a) that each extend along the wiping direction and are configured to guide the end cap spoiler element (16a, 16b).

20. The end cap device as claimed in claim 1, wherein the end cap spoiler unit (16a; 16b) includes a generally L-shaped catch hook (26a) and the end cap base member (14a; 14b) includes a barb (52a), wherein the catch hook 26(a) is configured to engage and capture the barb (52a).

21. The end cap device as claimed in claim 1, wherein the end cap spoiler unit (16a; 16b) includes a closure wall (56) configured to close off the opening (18a; 18b), wherein the closure wall (56) extends perpendicular to the longitudinal direction (38a; 38b).

22. An end cap device for a wiper blade (12a; 12b), the end cap device having an end cap base member (14a; 14b) which is configured to be securely connected to a main component (10a; 10b) of the wiper blade (12a; 12b) along a lower region of the end cap base member, wherein the end cap base member (14a; 14b) extends along a longitudinal direction (38a; 38b) and includes a first concave wind flow face (44a) along an upper region of the end cap base member, wherein the end cap device further includes at least one end cap spoiler element (16a; 16b) coupled to the end cap base member (14a; 14b) and configured to slide relative to the end cap base member (14a; 14b) so as to provide an assembly opening (18a; 18b) between the end cap base member and the end cap spoiler element (16a; 16b) for insertion of a wiper arm (20a; 20b) along the longitudinal direction (38a; 38b), wherein the end cap spoiler element (16a; 16b) includes a second concave wind flow face (54) along an upper region of the end cap spoiler element (16a; 16b) that is flush with the first concave wind flow face (44) in an assembled state of the end cap device, wherein the end cap spoiler unit (16a; 16b) further includes a generally L-shaped catch hook (26a) and the end cap base member (14a; 14b) includes a barb (52a), wherein the catch hook 26(a) is configured to engage and capture the barb (52a).

* * * * *